No. 782,980. PATENTED FEB. 21, 1905.
J. N. MOEHN.
CARBURETING APPARATUS.
APPLICATION FILED JAN. 13, 1904.
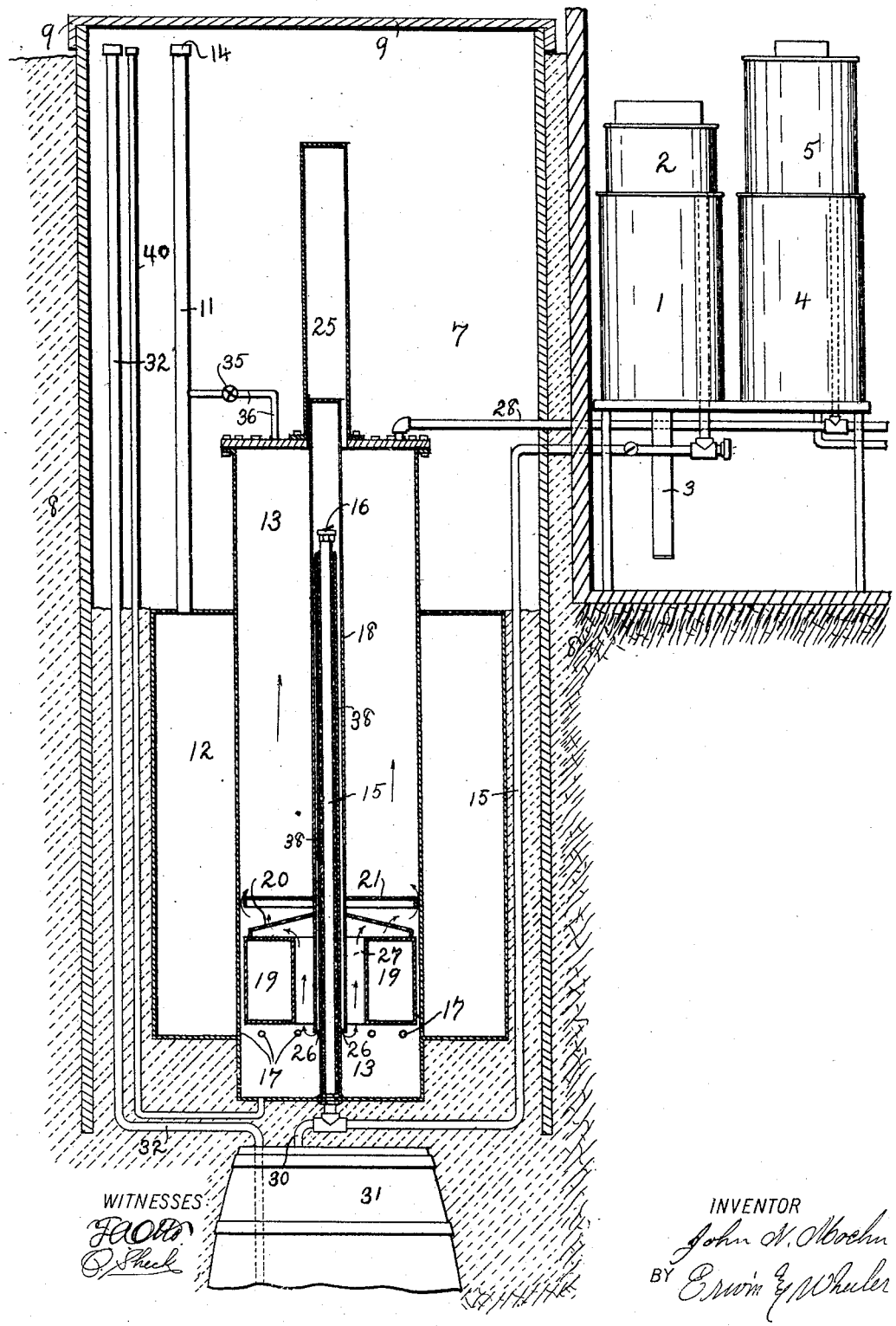
WITNESSES
INVENTOR
John N. Moehn
BY Erwin E. Wheeler
ATTORNEYS No. 782,980.

Patented February 21, 1905.

UNITED STATES PATENT OFFICE.

JOHN N. MOEHN, OF MILWAUKEE, WISCONSIN.

CARBURETING APPARATUS.

SPECIFICATION forming part of Letters Patent No. 782,980, dated February 21, 1905.

Application filed January 13, 1904. Serial No. 188,827.

*To all whom it may concern:*

Be it known that I, JOHN N. MOEHN, a citizen of the United States, residing at Milwaukee, county of Milwaukee, and State of Wisconsin, have invented new and useful Improvements in Carbureting Apparatus, of which the following is a specification.

My invention relates to improvements in carbureting apparatus.

The object of my invention is to provide a carbureter in which the temperature of the vaporizing liquid will remain uniform, the construction being such that the generating-chamber may be located under the surface of the ground at a point distant from the building to be supplied with gas.

My invention also contemplates a form of construction which will require but little attention and in which the quality of the gas to be produced will remain uniform.

In the following description reference is had to the accompanying drawing, in which my invention is shown in vertical section on a line passing centrally through the vaporizing-chamber and in front of the air-pump and storage-tank.

In the drawing, 1 represents the water-containing chamber of an air-pump, in which the reciprocating bell 2 is operated by a hydraulic jack 3. The valve connections of the jack are omitted, as these parts of the apparatus form no part of my invention, the construction thereof being well known.

4 is a water-containing chamber provided with a reciprocating gas-holding bell 5 of any ordinary construction.

The gas is generated in a pit 7, located underneath the surface of the ground, with the walls of the pit embedded in cement 8 and provided with a cover 9. A supply of carbureting liquid is maintained in an annular chamber 12, which is filled from time to time through a pipe 11, having a suitable cap 14 at its upper end underneath the cover 9. The carbureting liquid is permitted to flow from the chamber 12 into an interior chamber 13 through suitable apertures 17. The chamber 13 is extended below the liquid-supply chamber 12, so that a continued supply may be maintained in the chamber 13 until after all the liquid is exhausted from the chamber 12. An air-supply pipe 15 leads from the bell 2 of the air-pump through the bottom of the chamber 13 and upwardly within said chamber to a point near its top, where the end of the pipe is provided with a check-valve 16. A tube 18 fits loosely over that portion of the pipe 15 within the chamber 13, and said tube carries a float 19, which is connected with the tube by a perforated shield 20. A deflecting-cap 21 is located above said shield.

The upper end of the tube 18 is loosely engaged in a tubular extension 25, which projects upwardly from the upper end of chamber 13. The float 19 causes the tube 18 to rise and fall with the rise and fall of the liquid in chamber 13, and the air is delivered by the pipe 15 through the valve 16 into the tube 18, which being capped at the top directs the air downwardly between the tube 18 and the pipe 15, where the air is discharged into the liquid hydrocarbon at a point 26 below the bottom of the float 19, and therefore below the surface of such liquid, the float serving to keep the point of discharge at a uniform depth. The air thus forced through the liquid vaporizes a portion thereof and rises into the annular space 27 within the float 19, from which it passes upwardly through the perforate screen 20 and around the deflecting-cap 21 to the upper portion of the chamber 13. This chamber is connected with the gas-bell 5 through the medium of a pipe 28.

A pipe 30 leads from the lowest point in the air-pipe 15 to a waste-tank 31, which is located below all other portions of the apparatus. This waste-tank receives the water of condensation from the air and any water which may overflow or splash from the tank 1 into the pipe 15. The tank 31 is emptied from time to time by applying any ordinary pump to a suction-pipe 32.

The back-pressure of the gas in chamber 13 tends to hold the level of the liquid in that chamber below the level of the liquid in supply-chamber 12. Any sudden lowering of the liquid in supply-chamber 12 would tend to produce a vacuum in the upper portion of that chamber, (the chamber being sealed;) but the partial vacuum produced by the slow lowering of the liquid as the same as vaporized is relieved to a considerable extent by the development of gas from the surface of the liquid. If it should be found, however, that the back pressure in the chamber 13 is too great, the pressure in the two chambers 12 and 13 may be wholly or partially equalized by opening a valve 35 in a pipe 36, connecting the two chambers.

The air-pipe 15 is preferably covered by non-heat-conducting material 38, which prevents the water of condensation from freezing in the pipe, as the heat of the air would be otherwise rapidly absorbed by the vaporizing liquid hydrocarbon. With the covering 38, however, the heat is absorbed sufficiently to remove the water-vapor from the air and prevent it from diluting the hydrocarbon without freezing the water.

A pipe 40, connected with the lower end of the vaporizing-chamber 13, leads upwardly to a point near the top of the pit, and is provided with a suitable removable cap, whereby when the cover 9 is removed the end of the pipe 40 may be uncovered and a suction-pump applied to withdraw the contents of chamber 13. This is done whenever the gasolene in the chamber is found to be below the required standard of quality.

By providing a vaporizing-chamber 13, which extends below the supply-chamber it is obvious that the non-volatile portions of the carbureting liquid and any water condensed from the air which is driven through the carbureting liquid will settle in the downwardly-projecting portion of the chamber 13 and will effect the character of the gas produced by the apparatus until the level of the liquid rises above the apertures 17. It is also obvious that the draw-off pipe 40 permits the withdrawal of the water and other non-volatile liquid from the bottom of chamber 13 without disturbing the volatile liquid in the upper portion of the chamber or in the supply-chamber.

Having thus described my invention, what I claim as new, and desire to secure by Letters Patent, is—

1. In a carbureting apparatus, the combination of a supply-chamber; a generating-chamber in communication with the supply-chamber; a pipe leading from a source of air-supply upwardly in the generating-chamber to an elevated point of discharge therein; a tubular covering for said pipe provided with a float near its lower end and movable along the pipe, said covering and float being arranged with an intervening, annular, unobstructed space for the upward passage of gas and said tubular covering being closed at its upper end and open at its lower end; a perforated hood located above the float and connecting the float with the tubular covering; a gas-storage chamber; and a pipe leading from the generating-chamber to the storage-chamber.

2. In a carbureting apparatus, the combination of a generating-chamber; an annular supply-chamber encircling the generating-chamber and having perforations leading from the bottom of the supply-chamber to the generating-chamber; an air-supply pipe leading from a source of air-supply, upwardly in the generating-chamber, to a valved outlet; a tubular covering for said air-supply pipe, provided with a float near its lower end and movable along the pipe; a gas-conveying pipe leading from the upper portion of the generating-chamber; and a valved equalizing-duct communicating between the upper portions of the generating-chamber and the supply-chamber, the upper portions of said supply-chamber being otherwise air and gas tight.

3. In a carbureting apparatus, the combination of generating and supply chambers separated by an annular partition-wall perforated near its lower end; means for delivering air into the carbureting liquid in the generating-chamber; a gas-supply pipe leading from the upper portion of the generating-chamber; and a valved equalizing-duct connecting the upper portions of the generating and supply chambers; said supply-chamber being otherwise normally closed and rendered air and gas tight.

4. In a carbureting apparatus, the combination of an annular liquid-supply chamber; a vaporizing-chamber partially inclosed by and in communication with the liquid-supply chamber, and having a vertical tubular extension at its upper end; a float connected by a superposed perforated hood provided with a tubular central stem loosely fitting said tubular extension and capped at its upper end; an air-inlet pipe projecting upwardly in said tubular float-stem, and provided with a check-valve at its upper end; and a gas-supply pipe leading from the upper portion of the vaporizing-chamber; together with a valved equalizing-duct communicating between the upper portion of the vaporizing and liquid-supply chambers; said air-inlet pipe being covered by non-heat-conducting material within the vaporizing-chamber.

5. In a carbureting apparatus, the combination of a set of inclosing cement walls forming a suitable water-tight pit; supply and vaporizing chambers permanently embedded in said pit, with the bottom portion of the vaporizing-chamber in communication with the supply-chamber and extended below said supply-chamber; a supply-pipe leading from the upper portion of the pit to the supply-chamber; a withdrawal-pipe leading from the bottom of the vaporizing-chamber to the upper portion of the pit; an air-inlet pipe leading from a suitable source of air-pressure supply through the pit-walls and bottom of the vaporizing-chamber and upwardly to a valved extremity within the vaporizing-chamber; and a gas-supply pipe connected with said chamber.

In testimony whereof I affix my signature in the presence of two witnesses.

JOHN N. MOEHN.

Witnesses:
LEVERETT C. WHEELER,
JAS. B. ERWIN.